US009903304B2

(12) United States Patent
Zhang

(10) Patent No.: US 9,903,304 B2
(45) Date of Patent: Feb. 27, 2018

(54) CONTROL FOR OVERRUN CUTOFF OF INTERNAL COMBUSTION ENGINE

(71) Applicant: Continental Automotive GmbH, Hannover (DE)

(72) Inventor: Hong Zhang, Tegernheim (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 67 days.

(21) Appl. No.: 15/025,940

(22) PCT Filed: May 13, 2014

(86) PCT No.: PCT/EP2014/059708
§ 371 (c)(1),
(2) Date: Mar. 30, 2016

(87) PCT Pub. No.: WO2015/043774
PCT Pub. Date: Apr. 2, 2015

(65) Prior Publication Data

US 2016/0237943 A1 Aug. 18, 2016

(30) Foreign Application Priority Data

Sep. 30, 2013 (DE) ........................ 10 2013 219 701

(51) Int. Cl.
*F02D 41/12* (2006.01)
*F02D 41/30* (2006.01)
(Continued)

(52) U.S. Cl.
CPC ....... *F02D 41/3064* (2013.01); *F02D 41/045* (2013.01); *F02D 41/047* (2013.01);
(Continued)

(58) Field of Classification Search
CPC .... F02D 41/123; F02D 41/126; F02D 41/401; F02D 41/402
(Continued)

(56) References Cited

U.S. PATENT DOCUMENTS 4,257,363 A 3/1981 Zeller ........................ 123/406.5
6,539,916 B2 4/2003 Ueda et al. .................. 123/295
(Continued)

FOREIGN PATENT DOCUMENTS

CN 1760521 A 4/2006 ............ F02D 41/04
CN 1834434 A 9/2006 ............ F02D 13/02
(Continued)

OTHER PUBLICATIONS

Korean Office Action, Application No. 2017033104555, 7 pages, dated May 11, 2017.
(Continued)

*Primary Examiner* — Erick Solis
(74) *Attorney, Agent, or Firm* — Slayden Grubert Beard PLLC

(57) ABSTRACT

A method for controlling an internal combustion engine operated with direct fuel injection may include, during a transition phase after the end of an overrun cut-off with resumption of fuel injection and normal operation of the internal combustion engine, shifting an injection start time (SOI) by an adaptation value (ΔSOI) in relation to an injection start time (SOI) which lies later than an injection start time (SOI_Norm) determined during normal operation of the internal combustion engine.

17 Claims, 2 Drawing Sheets

Start of overrun cut-off operation S1
Increment counter ZS→ZS + ΔZS1 S2
ZS = ZS_MAX? S4
yes
no
End of overrun cut-off operation? S3
no
yes
KST - Injection "ON" S5
Decrement counter ZS→ZS - ΔZS2 S6
SOI → SOI + ΔSOI
ZS = 0? S7
no
yes
SOI = SOI_Norm S8
End S9

(51) Int. Cl.

| | |
|---|---|
| ***F02D 41/04*** | (2006.01) |
| ***F02D 41/24*** | (2006.01) |
| ***F02D 41/40*** | (2006.01) |
| ***F02D 41/18*** | (2006.01) |
| *F02D 41/38* | (2006.01) |

(52) U.S. Cl.
CPC .......... *F02D 41/126* (2013.01); *F02D 41/18* (2013.01); *F02D 41/2403* (2013.01); *F02D 41/401* (2013.01); *F02D 41/402* (2013.01); *F02D 2041/389* (2013.01); *Y02T 10/44* (2013.01)

(58) Field of Classification Search
USPC .......................... 701/105; 123/299, 325, 326
See application file for complete search history.

(56) References Cited

U.S. PATENT DOCUMENTS

| | | | | |
|---|---|---|---|---|
| 7,185,631 | B2 | 3/2007 | Takeda et al. | 123/406.11 |
| 7,212,910 | B2 | 5/2007 | Akasaka | 701/112 |
| 7,331,332 | B2 | 2/2008 | Baumann et al. | 123/481 |
| 7,383,813 | B2 | 6/2008 | Weiss et al. | 123/325 |
| 7,599,787 | B2 | 10/2009 | Hokuto et al. | 701/113 |
| 9,181,912 | B2 | 11/2015 | Arihara | |
| 2004/0237935 | A1* | 12/2004 | Fukusako | F02D 13/06 123/406.47 |
| 2012/0080009 | A1 | 4/2012 | Shibata et al. | 123/445 |
| 2014/0182557 | A1* | 7/2014 | Arihara | F02D 41/047 123/472 |
| 2015/0083073 | A1* | 3/2015 | Nagatsu | F02D 41/3035 123/294 |

FOREIGN PATENT DOCUMENTS

| | | | | |
|---|---|---|---|---|
| CN | 101151451 | A | 3/2008 | F02D 41/00 |
| DE | 2738886 | C2 | 10/1992 | F02D 37/00 |
| DE | 10011434 | A1 | 9/2001 | F02B 75/02 |
| DE | 10131927 | A1 | 2/2002 | F02B 17/00 |
| DE | 10147622 | A1 | 4/2003 | F02D 41/12 |
| DE | 10334401 | B3 | 11/2004 | F02D 37/02 |
| DE | 102005062552 | A1 | 7/2007 | F02D 41/10 |
| EP | 0614003 | B1 | 1/1997 | F02D 41/00 |
| EP | 1361354 | A2 | 11/2003 | F02D 41/02 |
| WO | 2012/161127 | A1 | 11/2012 | F02D 41/32 |
| WO | 2015/043774 | A1 | 4/2015 | F02D 41/04 |

OTHER PUBLICATIONS

German Office Action, Application No. 102013219701.2, 5 pages, dated Apr. 25, 2014.

International Search Report and Written Opinion, Application No. PCT/EP2014/059708, 18 pages, dated Nov. 10, 2014.

Chinese Office Action, Application No. 201480054042.1, 16 pages, dated Sep. 21, 2017.

* cited by examiner

CONTROL FOR OVERRUN CUTOFF OF INTERNAL COMBUSTION ENGINE

CROSS-REFERENCE TO RELATED APPLICATIONS

This application is a U.S. National Stage Application of International Application No. PCT/EP2014/059708 filed May 13, 2014, which designates the United States of America, and claims priority to DE Application No. 10 2013 219 701.2 filed Sep. 30, 2013, the contents of which are hereby incorporated by reference in their entirety

TECHNICAL FIELD

The application describes a method and a device for controlling an internal combustion engine, specifically related to the transition between operation with overrun cut-off and normal operation of an internal combustion engine with direct fuel injection.

BACKGROUND

For reasons relating to the ever more crucial saving of fuel and in order to reduce pollutant emissions, it is common in the control of modern internal combustion engines for the supply of fuel to the cylinders to be reduced, or deactivated entirely, during overrun operation.

In general, overrun operation or trailing-throttle operation refers to a situation in which, with the throttle flap closed, the speed of the internal combustion engine lies above a certain predefined value, for example the idle speed. Overrun operation may however also be identified as a situation in which the internal combustion engine is at a speed higher than that which corresponds to the position of the throttle flap in the case of an Otto-cycle internal combustion engine or to the injected fuel quantity in the case of a diesel internal combustion engine. Instead of evaluating the throttle flap position or fuel quantity, it is also possible for consideration to be given to the signal of a pedal transducer of an accelerator pedal.

Since it is not desired for the internal combustion engine to perform work during overrun operation, it is possible in said operating state for the supply of fuel to be stopped, which is generally referred to as overrun cut-off or overrun deactivation.

Upon the transition from overrun operation to overrun cut-off, a step change in torque generally occurs owing to the interruption of the fuel supply, which step change in torque is under some circumstances perceptible in the vehicle as a jerk and can impair the running smoothness of the internal combustion engine and the driving comfort for the occupants of the vehicle that is driven by way of the internal combustion engine. The same problem arises if, after operation after overrun cut-off, it is the intention for normal driving operation of the vehicle to be resumed and for a desired torque to again be generated and output to the wheels of the vehicle by the internal combustion engine.

In this context, the expression "normal operation" is to be understood to mean fired operation of an internal combustion engine outside overrun cut-off, that is to say operation with an enabled fuel supply.

Various measures have already been proposed to reduce the undesired step change in torque that arises as a result of the deactivation or activation of the fuel injection during overrun operation.

For example, EP 0 614 003 B1 has described a method for controlling the fuel supply to an internal combustion engine with multiple cylinders and successive injections into the cylinders in a predefined sequence in the overrun operation range. Here, characteristic operating variables of the internal combustion engine are detected, and a start and an end of overrun operation are identified if said characteristic operating variables satisfy particular conditions. The fuel supply to the cylinders is, upon the start of overrun, reduced in accordance with a selectable function and, upon the end of overrun, is enabled again in accordance with a selectable function, wherein, after identification of overrun operation, the injections for individual cylinders are suppressed in accordance with a predefined sequence and, after identification of the end of overrun, the injections for individual cylinders are resumed in accordance with a further predefined sequence. The sequences are determined by way of a chronological sequence of individual suppression patterns stored in a memory of an electronic control apparatus. By means of such selective suppression of individual impulses of the individual cylinders, it is possible for the step change in torque upon the transitions to be considerably reduced.

DE 27 38 886 C3 describes a method for the electrical control of the operating behavior of an internal combustion engine with applied ignition in and after overrun operation, wherein the fuel supply can be shut off during said overrun operation and an ignition adjustment is performed. At the start, or proceeding from a predefined point in time after the start, of overrun operation, the ignition time is retarded in accordance with the selectable function, and, after the start of the overrun operation, the fuel supply is maintained for a definable time duration and, in response to a trigger signal, the ignition time is returned from a retarded position to the normal ignition time again in accordance with a selectable function in order to realize a smooth transition. The trigger signal is defined by the end of the overrun operation and/or the end of the shut-off of the fuel supply to the internal combustion engine by a signal from a transducer for the throttle flap opening angle and/or by a selectable engine speed. Subsequently, the retarding of the ignition time is reduced, and toward the end of the overrun operation, the fuel quantity supplied to the internal combustion engine is temporarily increased.

DE 103 34 401 B3 has disclosed a method and a device for controlling the transition between normal operation and operation with overrun cut-off in the case of an Otto-cycle engine operated with direct fuel injection, wherein, to avoid an inadmissible step change in torque that arises upon overrun cut-off as a result of deactivation of the fuel injection, the ignition angle is retarded. To further reduce the step change in torque, fuel is injected into a cylinder of the Otto-cycle engine in the form of multiple injections, wherein at least a partial amount of the fuel to be injected is deposited during the compression phase.

SUMMARY OF THE INVENTION

It has hitherto been the case that, upon the resumption of the fuel supply after the ending of the overrun cut-off, the injection parameters are set as in normal fired operation. In particular, the injection start time is defined in a manner dependent on the engine speed, load and temperature of the internal combustion engine. The decision as to whether or not multiple injection is activated is also dependent primarily on said parameters of the internal combustion engine.

Aside from the problem that a certain jerk arises upon said operational transitions, there is also the risk of the temperature in the combustion chamber dropping significantly during overrun cut-off operation, giving rise to increased emissions upon resumption of the combustion after the end of overrun cut-off operation.

In particular in the case of internal combustion engines in which the fuel is injected directly into the combustion chambers (direct fuel injection), precautions must be taken to ensure that increased particle emissions do not arise upon resumption of the fuel supply after overrun cut-off operation. In the context of the future Euro 6 exhaust-gas standard, it is necessary for motor vehicles that have an Otto-cycle engine with direct fuel injection to adhere to the prescribed limit value for the particle count (PN) of $6.0*10^{11}$/km (with a three-year transition limit of $6.0*10^{12}$/km).

The instant disclosure teaches a method and a device by means of which it is possible to achieve a greater reduction in particle emissions upon the resumption of the fuel supply after overrun cut-off operation of an internal combustion engine that operates with direct fuel injection.

The method and the device for controlling the transition between operation with overrun cut-off and normal operation in the case of an internal combustion engine that is operated with direct fuel injection is characterized in that, during a transition phase after the end of the overrun cut-off with resumption of the fuel injection and normal operation of the internal combustion engine, the injection start time is shifted by an adaptation value in relation to an injection start time which lies later than an injection start time determined during normal operation of the internal combustion engine (10).

During the overrun cut-off, the combustion chamber, in particular the cylinder walls and the piston, cool down to a great extent owing to the absence of combustion and the air mass that is scavenged through. In the case of conventional systems which, upon the resumption of the fuel supply after overrun cut-off, start with an injection time which is also used during normal operation, that is to say during fired operation, the fuel mass that has collected on the piston during the injection can no longer evaporate in good time before the combustion, which gives rise to increased particle emissions.

As a result of retarding of the injection start time during the transition phase, less fuel mass strikes the piston during the injection, whereby the particle emissions during said transition phase are considerably lowered.

Since the cooling action is very highly dependent on the duration of the overrun cut-off, it is the case in an advantageous refinement that the adaptation value is selected in a manner dependent on said duration.

The duration of the overrun cut-off may be determined in a simple manner by way of a time counter, wherein the time counter is started at the start of the overrun cut-off, and during the time duration of the overrun cut-off, the counter status of the time counter is incremented in predefined steps (scanning steps) by a first value. Upon ending of the overrun cut-off, the counter status of the time counter is decremented in predefined steps by a second value, and when a counter status of equal to zero is reached, the shift of the injection start time is ended. Then, the injection start time determined for normal operation of the internal combustion engine is used.

To allow for the cooling, the first and the second value are selected in a manner dependent on the magnitude of the air mass flow in the intake tract of the internal combustion engine and/or in a manner dependent on a speed and the load of the internal combustion engine.

By virtue of the fuel mass to be metered in being divided into multiple injection processes, it is possible in a simple manner for the depth of penetration of the fuel jet to be reduced, which leads to reduced wetting of the piston and thus likewise to a reduction in particle emissions.

BRIEF DESCRIPTION OF THE DRAWINGS

Further advantages and refinements of the present invention will emerge from the description of the following exemplary embodiment, which is illustrated in the drawing, in which.

DETAILED DESCRIPTION

Figure 1:
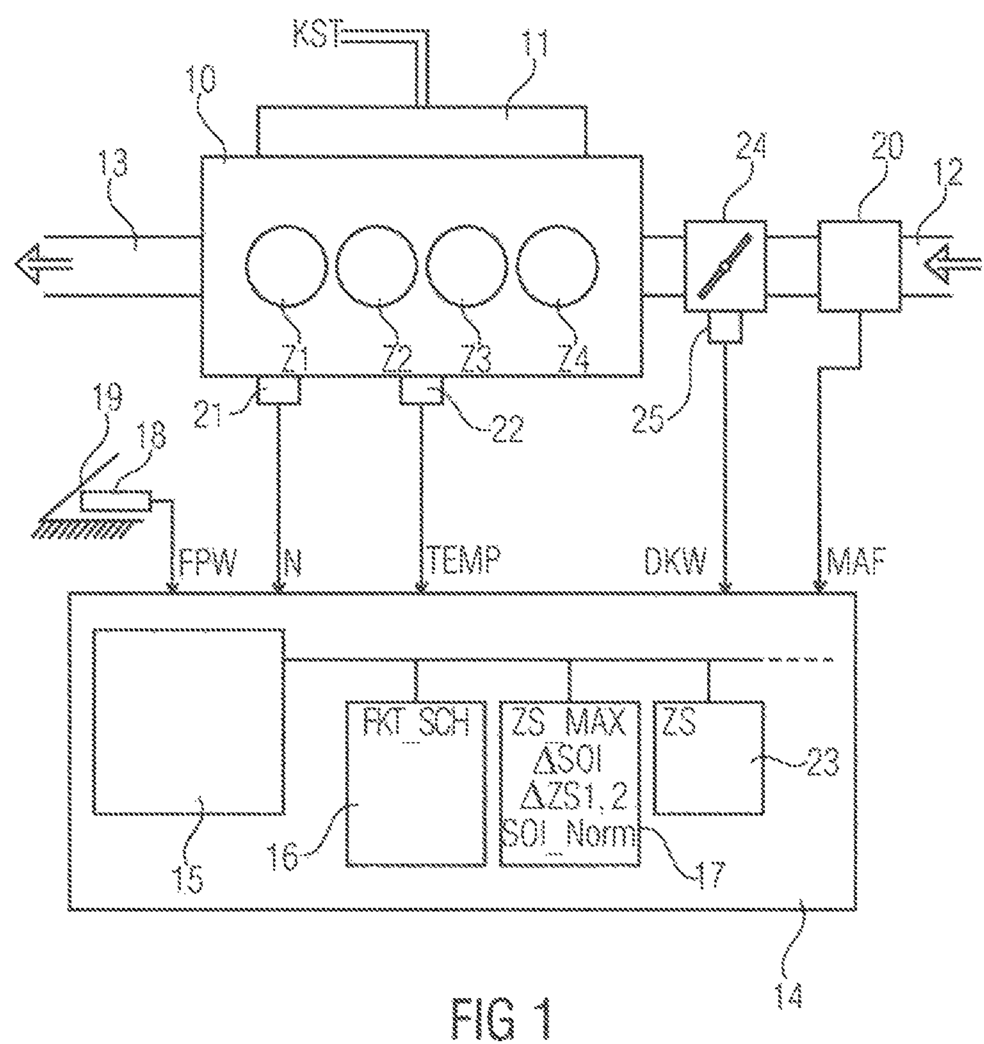
FIG. 1 shows, in a schematic illustration, a block diagram of an internal combustion engine which is operated with direct fuel injection and which has the control device according to teachings of the present disclosure.

FIG. 1 shows, in a schematic illustration, an Otto-cycle internal combustion engine 10 which has a fuel supply device 11 for injecting fuel KST directly into combustion chambers of cylinders Z1-Z4. The internal combustion engine 10 is supplied with the fresh air required for the combustion of the fuel-air mixture in the cylinders Z1-Z4 via an intake tract 12. The combustion exhaust gases flow through at least one exhaust-gas catalytic converter, which is arranged in an exhaust tract 13, and through a silencer into the surroundings.

For the control of the transition between operation with overrun cut-off and normal operation of the internal combustion engine 10, an electronic control device 14 is provided. The control device 14 comprises a processing unit (processor) 15 which is coupled to a program memory 16, to a value memory (data memory) 17 and to a time counter 23. Inter alia, there is implemented in software form in the program memory 16 a characteristic map-based function FKT_SCH for the control of the transition between operation with overrun cut-off and normal operation of the internal combustion engine 10, which function will be discussed in more detail on the basis of the description of FIG. 2.

Figure 2:
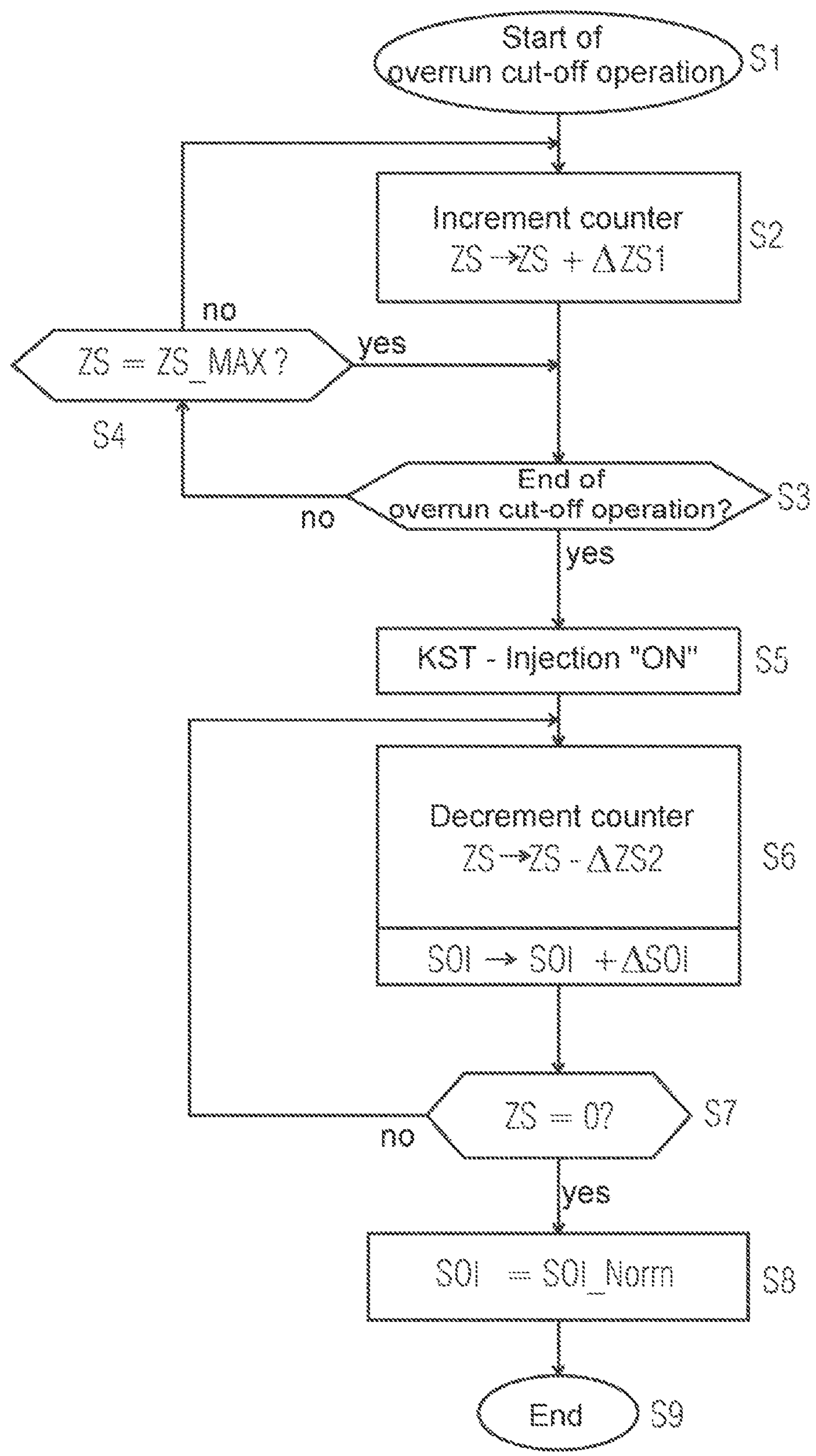
FIG. 2 shows a flow diagram of the control of the transition between operation with overrun cut-off and normal operation of said internal combustion engine according to teachings of the present disclosure.

In the value memory 17 there are stored, inter alia, parameters or threshold values SOI_Norm, ΔSOI, ΔZS1,2, ZS_MAX, the meanings of which will likewise be discussed in more detail further below on the basis of the description of FIG. 2.

The control device 14 is connected to various sensors which detect operating parameters of the internal combustion engine 10 and operating parameters of the motor vehicle that is driven by way of the internal combustion engine 10. The sensors are inter alia an accelerator pedal position sensor 18, which detects an accelerator pedal value FPW, that is to say detects the position of an accelerator pedal 19, an air mass sensor 20 which is arranged in the intake tract 12 and which serves as a load sensor and which detects a signal MAF corresponding to the load of the internal combustion engine 10, a throttle flap sensor 25 which detects a throttle flap opening angle DKW of a throttle flap 24 arranged in the intake tract 12, a crankshaft angle sensor 21, which detects a crankshaft angle of the internal combustion engine 10, to which an engine speed N is then assigned, and a temperature sensor 22, which detects a signal TEMP which is representative of the temperature of the internal combustion engine 10, generally the coolant temperature of the internal combustion engine 10.

Said sensors are normally provided in any case, because the signals thereof may be used for the control program of the engine management system.

Instead of the air mass sensor 20 as a load sensor, it is alternatively or additionally also possible for an intake pipe pressure sensor to be used.

In some embodiments, the control program FKT_SCH for the control of the transition between operation with overrun cut-off and normal operation is not executed in a separate control device 14 but is contained as a sub-program in the management system of the engine controller. In this way, it is possible to dispense with additional hardware.

The method for controlling the transition between operation with overrun cut-off and normal operation will be discussed on the basis of a flow diagram in FIG. 2.

The method is started, in a step S1, whenever the fuel supply to the cylinders Z1-Z4 is shut off in overrun operation of the internal combustion engine 10, that is to say overrun cut-off operation is present.

At the start of said overrun cut-off phase, the time counter 23 is started in a step S2, and, during the ongoing operation of the overrun cut-off phase, said time counter is incremented by a first value ΔZS1 per scan. The value of the increment ΔZS1 is dependent on the air mass flow MAF through the cylinder Z1-Z4 and is stored in a characteristic map of the value memory 17. In this way, the cooling of the internal combustion engine, in particular the cooling of the combustion chambers and of the pistons, owing to the air mass flow MAF can be allowed for. Said air mass flow MAF may advantageously be detected directly by the air mass sensor 20. Alternatively or in addition, the engine speed and the load may also be taken into consideration.

The overrun cut-off operating range is maintained until, in a subsequent step S3, ending of the overrun cut-off operation, that is to say resumption of the fuel injection into the cylinders Z1-Z4, is detected.

If the conditions for overrun cut-off operation are still met, then it is queried in a step S4 whether the counter status ZS of the counter 23 has reached a predefined maximum value ZS_MAX. The maximum value ZS_MAX is stored in the value memory 17 and defines the maximum time duration for which the shift of the injection start time in the retarding direction is used.

The loop composed of the steps S2, S3 and S4 is run through until either the maximum value ZS_MAX has been reached or the overrun cut-off operating range has been departed from, for example because the driver of the vehicle that is operated by way of the internal combustion engine 10 has actuated the accelerator pedal 19.

In the event of the accelerator pedal actuation, that is to say upon the departure from the overrun cut-off operation, the fuel injection is enabled in a subsequent step S5, and in a step S6, the time counter 23 is restarted and, during the ongoing fired operation of the internal combustion engine 10, is decremented by a second value ΔZS2 per scan. The value of the decrement ΔZS2 is dependent on the air mass flow MAF or on the engine speed N and the load, and is likewise stored in a characteristic map of the value memory 17.

With the resumption of the fuel injection, the injection start time SOI is shifted by a value ΔSOI in the direction of an injection start time SOI+ΔSOI which lies at a later point in time than the injection start time determined from speed, load and temperature of the internal combustion engine. The value ΔSOI may in this case be set in a manner dependent on the counter status ZS, wherein the value ΔSOI is greater the higher the counter status ZS is.

Alternatively, the injection start time SOI may also, regardless of the counter status ZS, be shifted by a constant value ΔSOI in the direction of an injection start time SOI which lies at a later point in time. Said value is also stored in the value memory 17.

After the shift of the injection start time SOI has been performed, it is queried in a step S7 whether the counter status ZS has already reached the value zero. If this is not yet the case, then a branch is followed back to step S6, and a further shift of the injection start time SOI is performed.

If the counter status ZS has reached the value zero, no further shift is performed, and a value SOI_Norm is assumed which is determined from the present operating point of the internal combustion engine (engine speed, load, temperature) (step 8). Subsequently, the method is ended in a step S9.

Furthermore, it is also possible, upon the resumption of the fuel injection in step S6, for the fuel mass to be metered in to additionally be introduced into the combustion chamber in the form of multiple injections in order to reduce the penetration of the fuel jet. The multiple injections are activated until the counter status ZS has reached the value zero. The division factor for the multiple injections may in this case preferably be defined in a manner dependent on the counter status ZS. The lower the counter status ZS is, the greater is the proportion of the divided total fuel mass to be metered in that is assigned to the first injection of the multiple injections.

LIST OF REFERENCE DESIGNATIONS

10 Otto-cycle internal combustion engine
11 Fuel supply apparatus
12 Intake tract
13 Exhaust tract
14 Electronic control device
15 Control unit, processing unit, processor
16 Program memory
17 Data memory, value memory
18 Accelerator pedal position transducer
19 Accelerator pedal
20 Air mass sensor, load sensor
21 Crankshaft angle sensor
22 Temperature sensor
23 Time counter
24 Throttle flap
25 Throttle flap sensor
DKW Throttle flap opening angle
FKT_SCH Control function, overrun cut-off operation
FPW Accelerator pedal value
KST Fuel
MAF Air mass flow, load signal
N Speed of the internal combustion engine
SOI Injection start time, start of injection
ΔSOI Adaptation value for injection start time
SOI_Norm Injection starting time for normal operation
TEMP Internal combustion engine temperature
Z1-Z4 Cylinders of the internal combustion engine
ZS Counter status
ΔZS1 Increment counter status
ΔZS2 Decrement counter status
ZS_MAX Maximum value of counter status
S1-S9 Method steps

What is claimed is:

1. A method for controlling an internal combustion engine operated with direct fuel injection, the method comprising:

at a beginning of an overrun cut-off operating state, stopping a supply of fuel to combustion chambers of the internal combustion engine and starting a time counter incremented from zero in steps of a first magnitude as time elapses;

entering a transition phase after the overrun cut-off operating state;

at a beginning of the transition phase, reversing the time counter in decrements of a second magnitude as time elapses;

during the transition phase, resuming fuel injection and retarding an injection start time in relation to a normal injection start time based on normal operation of the internal combustion engine; and when the time counter reaches zero, entering normal operation of the internal combustion engine.

2. The method as claimed in claim 1, wherein a magnitude of the retardation of the injection start time depends on a time duration of the overrun cut-off.

3. The method as claimed in claim 1, wherein the magnitude of the retardation of the injection start time depends on a value of the time counter.

4. The method as claimed in claim 3, wherein the magnitude of the retardation of the injection start time is greater the higher the value of the time counter is.

5. The method as claimed in claim 1, wherein the fuel mass to be metered in is injected in the form of multiple injections during the transition phase.

6. The method as claimed in claim 5, wherein a division factor for the multiple injections depends on a value of the time counter, and the lower the value of the counter is, the greater the fuel mass injected by a first injection of the multiple injections.

7. The method as claimed in claim 5, wherein the multiple injections are performed until the value of the counter reaches zero.

8. The method as claimed in claim 1, wherein the first magnitude and the second magnitude depend a magnitude of an air mass flow (MAF) in an intake tract of the internal combustion engine.

9. The method as claimed in claim 1, wherein the first magnitude and the second magnitude depend a speed (N) and a load of the internal combustion engine.

10. An internal combustion engine operated with direct fuel injection, the internal combustion engine comprising:

at least one combustion chamber;

a fuel injector metering fuel into the at least one combustion chamber; and a controller operable to adjust the timing and amount of fuel metered by the fuel injector, wherein the controller is programmed to:

at a beginning of an overrun cut-off operating state, stop a supply of fuel to the at least one combustion chamber and start a time counter incremented from zero in steps of a first magnitude as time elapses;

enter a transition phase after the overrun cut-off operating state;

at a beginning of the transition phase, reverse the time counter in decrements of a second magnitude as time elapses;

during the transition phase, resume fuel injection and retard an injection start time in relation to a normal injection start time based on normal operation of the internal combustion engine; and when the time counter reaches zero, enter a normal operation phase of the internal combustion engine.

11. The internal combustion engine as claimed in claim 10, wherein a magnitude of the retardation of the injection start time depends on a time duration of the overrun cut-off.

12. The internal combustion engine as claimed in claim 10, wherein the magnitude of the retardation of the injection start time depends on a value of the time counter.

13. The internal combustion engine as claimed in claim 12, wherein magnitude of the retardation of the injection start time is greater the higher the value of the time counter is.

14. The internal combustion engine as claimed in claim 10, wherein, upon, the fuel mass to be metered in is injected in the form of multiple injections during the transition phase.

15. The internal combustion engine as claimed in claim 14, wherein a division factor for the multiple injections depends on a value of the time counter, and the lower the value of the counter is, the greater the fuel mass injected by a first injection of the multiple injections.

16. The internal combustion engine as claimed in claim 10, wherein the first magnitude and the second magnitude depend on a magnitude of an air mass flow (MAF) in an intake tract of the internal combustion engine.

17. The internal combustion engine as claimed in claim 10, wherein the first magnitude and the second magnitude depend on a speed (N) and a load of the internal combustion engine.

* * * * *